United States Patent
Nordin et al.

(10) Patent No.: US 12,412,551 B2
(45) Date of Patent: Sep. 9, 2025

(54) REAL-TIME MUSIC GENERATION ENGINE FOR INTERACTIVE SYSTEMS

(71) Applicant: REACTIONAL MUSIC GROUP AB, Stockholm (SE)

(72) Inventors: Jesper Nordin, Hägersten (SE); Jonatan Liljedahl, Hamburgsund (SE); Jonas Kjellberg, Västra Frölunda (SE); Pär Gunnars Risberg, Stockholm (SE)

(73) Assignee: REACTIONAL MUSIC GROUP AB, Stockholm (SE)

( * ) Notice: Subject to any disclaimer, the term of this patent is extended or adjusted under 35 U.S.C. 154(b) by 774 days.

(21) Appl. No.: 17/277,815

(22) PCT Filed: Sep. 20, 2019

(86) PCT No.: PCT/SE2019/050899
§ 371 (c)(1),
(2) Date: Mar. 19, 2021

(87) PCT Pub. No.: WO2020/067969
PCT Pub. Date: Apr. 2, 2020

(65) Prior Publication Data
US 2021/0350777 A1    Nov. 11, 2021

(30) Foreign Application Priority Data
Sep. 25, 2018   (SE) .................... 1851145-1

(51) Int. Cl.
*G10H 1/00*     (2006.01)
*G06N 20/00*    (2019.01)

(52) U.S. Cl.
CPC .......... *G10H 1/0025* (2013.01); *G06N 20/00* (2019.01); *G10H 1/0066* (2013.01);
(Continued)

(58) Field of Classification Search
CPC .......... G10H 1/0025; G10H 2210/111; G10H 2210/145; G10H 2240/056; G10H 1/0066; G06N 20/00
See application file for complete search history.

(56) References Cited

U.S. PATENT DOCUMENTS 6,898,759 B1    5/2005  Terada et al.
2002/0194984 A1*  12/2002  Pachet ................ G10H 1/0025
                                                    84/609

(Continued)

OTHER PUBLICATIONS

International Search Report, issued in PCT/SE2019/050899, dated Dec. 5, 2019.

(Continued)

*Primary Examiner* — Jianchun Qin
(74) *Attorney, Agent, or Firm* — Birch, Stewart, Kolasch & Birch, LLP

(57) ABSTRACT

A real-time music generation engine for an interactive system includes a Musical Rule Set (MRS AND/OR CA AND/OR PCU) unit configured to combine predefined composer input with a real-time control signal into a music signal; a Constructor Automaton (CA) configured to generate a fluid piece of music based on rule definitions defined by the predefined composer input within the MRS AND/OR CA AND/OR PCU unit by musical handlers; and a Performance Cluster Unit (PCU) configured to convert the fluid piece of music from the CA into a corresponding music control signal for real-time playback by the interactive system.

20 Claims, 5 Drawing Sheets

(52) U.S. Cl.
CPC .. *G10H 2210/111* (2013.01); *G10H 2210/145* (2013.01); *G10H 2240/056* (2013.01)

(56) References Cited

U.S. PATENT DOCUMENTS

| | | |
|---|---|---|
| 2003/0037664 A1 | 2/2003 | Comair et al. |
| 2007/0221044 A1 | 9/2007 | Orr |
| 2008/0066609 A1* | 3/2008 | Bourgeois ............ G10H 1/0025 84/609 |
| 2008/0156178 A1 | 7/2008 | Georges et al. |
| 2009/0114079 A1 | 5/2009 | Egan |
| 2010/0307320 A1 | 12/2010 | Hoeberechts et al. |
| 2013/0305908 A1 | 11/2013 | Iwase et al. |
| 2014/0000440 A1 | 1/2014 | Georges et al. |
| 2017/0092247 A1 | 3/2017 | Silverstein |

OTHER PUBLICATIONS

Written Opinion of the International Searching Authority, issued in PCT/SE2019/050899, dated Dec. 5, 2019.

* cited by examiner

REAL-TIME MUSIC GENERATION ENGINE FOR INTERACTIVE SYSTEMS

BACKGROUND

Technical Field

The present disclosure is directed to music generation in interactive systems and software. More particularly, the invention relates to systems and methods for real-time music generation, as opposed to playback.

Interactive systems such as, but not limited to, Virtual Reality (VR) Systems, Augmented Reality (AR) Systems, video games, computer games, and mobile games often contain music intended to enhance the user experience. Interactivity inherently lets the user decide which virtual setting is currently being presented and for how long, meaning that there are no pre-defined timing cues of events that can be matched exactly with corresponding events or accents in the music beforehand, which is why music for movies can be perfectly matched with the story line. One way to better match the music within an interactive system would be to generate the music in real-time, just like an orchestra in a theatre being able to instantly react to what is being expressed on stage.

State-of-the-Art

Previously disclosed interactive systems most often construct the accompanying music by playing back combinations of pre-composed loops in an event driven way that is triggered by parameters in the interactive system, leading to different levels of interactivity depending on the granularity and complexity of said music loops.

SUMMARY

One objective of the present disclosure is to provide a real-time music generation engine and method for enabling real-time interactive music generation in an interactive system.

Another objective is to provide a computer program product comprising instructions enabling real-time interactive music generation in an interactive system.

The above objectives are wholly or partially met by devices, systems, and methods according to the appended claims in accordance with the present disclosure. Features and aspects are set forth in the appended claims, in the following description, and in the annexed drawings in accordance with the present disclosure.

According to a first aspect, there is provided a real-time music generation engine for an interactive system, wherein the music generation engine and the interactive system are communicatively connected to transmit parameters relating to music generation between them. The music generation engine comprises a Musical Rule Set (MRS) unit comprising a pre-defined composer input, said MRS unit is configured to combine said predefined composer input with a real-time control signal into a music signal; a Constructor Automaton (CA) configured to generate a fluid piece of music based on rule definitions defined by the predefined composer input within the MRS unit by means of musical handlers; a Performance Cluster Unit (PCU) configured to convert the fluid piece of music from the CA into a corresponding music control signal wherein the corresponding music control signal is in Musical Instrument Digital Interface (MIDI) form, or the corresponding music control signal is used for real-time playback by the interactive system, by means of controlling at least one Audio Block operatively connected to said interactive system.

In an exemplary embodiment the music control signal from the PCU is adapted for loopback to a musically trained AI system for iterative training and directing the real time music generation.

In another embodiment the music engine further comprises a Genetic Design Layer, GDL, configured to mutate musical characteristics from the rule definitions based on the real-time control signal or predefined musical knowledge within a musically trained AI system.

In yet another embodiment the CA is further configured to generate new fluid music by combining the rule definitions and the new mutated musical characteristics from the GDL.

In an exemplary embodiment the music generation engine further comprises an Audio Analysis Block, AAB, configured to analyze spectral information of any outputted audio being played back by the interactive system and the PCU is further configured to respond to said spectral information such that the generated music does not interfere with other important audio elements in the interactive system by means of restricting use of certain notes and/or instruments that would otherwise risk obscuring said important audio elements. The spectral information may be classified in accordance to spectral density.

In further embodiments the real-time music generation engine is configured to allow the generated music to be reviewed and adjusted at any time during run-time.

According to a second aspect, there is provided a method for generating real-time music in a music generation engine for an interactive system communicatively connected to said music generation engine to transmit parameters relating to music generation between them, wherein said music generation engine comprising a Musical Rule Set (MRS) unit, a Constructor Automaton (CA) and a Performance Cluster Unit (PCU) said method comprises the steps of retrieving a predefined composer input in the MRS unit; storing a plurality of adaptable rule definitions according to the retrieved predefined composer input in a memory of the MRS unit; receiving a real-time control signal in the MRS unit;

combining said predefined composer input with a real-time control signal into a music signal; generating a fluid piece of music based on the rule definitions defined by the predefined composer input in the CA by means of musical handlers; and converting the fluid piece of music from the CA into a corresponding music control signal in the PCU for real-time playback by the interactive system, by means of controlling at least one Audio Block operatively connected to said interactive system.

In an exemplary embodiment the music control signal from the PCU is adapted for loopback to a musically trained AI system for iterative training and directing the real time music generation.

In yet another embodiment the method further comprises mutating musical characteristics from the rule definitions based on the real-time control signal or predefined musical knowledge within a musically trained AI system in a Genetic Design Layer, GDL, within the music generation engine.

In another embodiment the method further comprises generating new fluid music by combining the rule definitions and the new mutated musical characteristics from the GDL.

In a further embodiment the method further comprises analyzing spectral information of any outputted audio being played back by the interactive system in an Audio Analysis Block, AAB, within the music generation engine and responding to said spectral information in the PCU, such that the generated music does not interfere with other important audio elements in the interactive system by means of restricting use of certain notes and/or instruments that would otherwise risk obscuring said important audio elements. Preferably, the spectral information may be classified in accordance to spectral density.

In other embodiments the method further comprises reviewing and adjusting the generated music at any time during run-time.

According to a third aspect, there is provided a computer program product comprising computer-readable instructions which, when executed on a computer, causes a method according to the above to be performed.

BRIEF DESCRIPTION OF THE DRAWINGS

The invention is now described, by way of example, with reference to the accompanying drawings, in which:

FIG. 1 shows an example schematic of a real-time music generation engine for an interactive system. In one example, the music engine comprises a Musical Rule Set (MRS) unit 9, a Genetic Design Layer (GDL) 5, a Constructor Automaton (CA) 11, a Performance Cluster Unit (PCU) 13, a loopback unit 15. The music engine can receive a real-time control signal from a composer input 1, an Artificial Intelligence Assistant Composer (AIAC) 3, a music neuron network, a Genetic Design Layer (GDL) 5. The composer input 1, the AIAC 3, the GDL and the music neuron network will be described in the following content.

Figure 1:
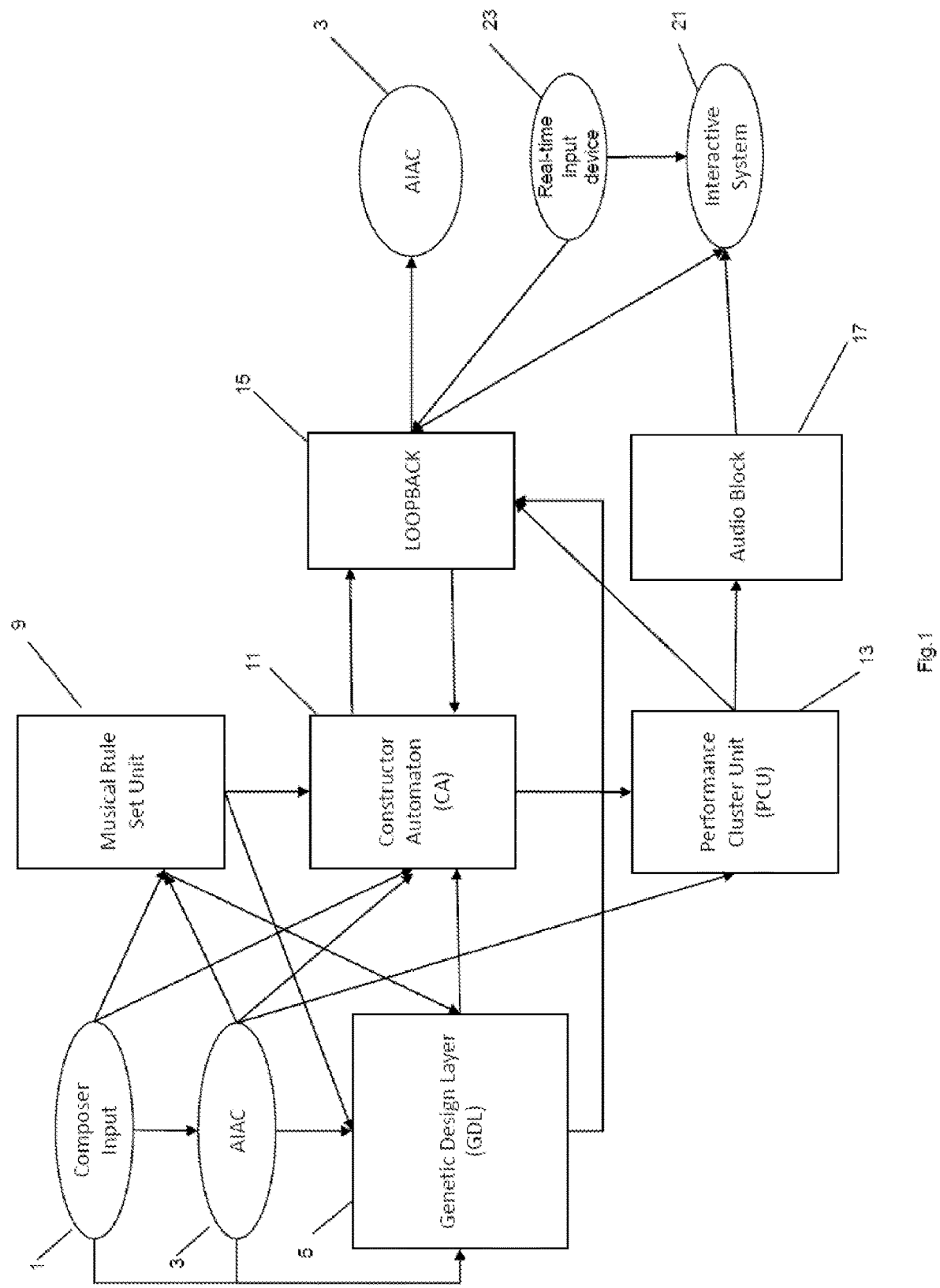
FIG. 1 is a schematic of a real-time music generation engine for an interactive system in accordance with the present disclosure.

The composer input 1 is made by means of using a separate instance of the engine using, but not limited to, a Virtual Studio Technology (VST), a standalone Graphical User Interface (GUI) authoring software, a tablet application, a local or public web server or any other software incorporating the real time music generation engine. This input serves to define the musical scope of and preferences of the resulting music. The input can contain any collection of settings used to set up the MRS 9 as well as the CA 11 in ways of direct manipulation, locally stored settings, downloaded community made settings, MIDI files of precomposed musical source data etc.

The composer input 1 may be further modified through the use of a musically trained Artificial Intelligence Assistant Composer (AIAC). Such AI acting as a musician may be based on a certain deep learning and/or artificial neural network implementation such as, but not limited to, Deep Feed Forward, Recurrent Neural Network, Deep Convolutional Network, Liquid State Machine and the likes. Said AI may also be based on other structures such as, but not limited to, Finite State Machines, Markov Chains, Boltzmann Machines and the likes. The fundamental knowledge which these autonomous processes are based upon, may be a mixture of conventional musical rules, such as the studies of counterpoint, Schenkerian analysis and similar musical processes, as well as community driven voting per generation or other means of human quality assurance. The knowledge may also be sourced through deep analysis of existing music in massive scale using online music libraries and streaming services through means such as but not limited to, Fast Fourier Transform (FFT)/Short Time Fourier Transform (STFT) analysis of content using neural networks and Haar cascades, pitch detection in both spectral/temporal and frequency domains, piggybacking on existing Application Programming Interfaces (API) per service or using Content ID systems otherwise designed for copyright identification, etc. Furthermore, said AI can be trained using existing music libraries by means of audio analysis, polyphonic audio analysis, metadata tags containing information about certain musical rules such as, but not limited to, scales, key, meter, character, instruments, genre, style, range, tessitura, and the likes.

The GDL 5 uses the information from the Musical Rule Set unit 9 and mutates it based on supplied stimuli from either the real-time control signal driven by events or a wealth of predefined musical knowledge within the AIAC system 3. For instance, motifs and rhythmic patterns defined in the Musical Rule Set unit 9 can be passed through a neural network which slightly modifies, mutates and improvises upon the data. This means a small pool of musical definitions and predefined blocks can be elongated into hours of musical material. The MRS unit 9 has several blocks managing different musical characteristics. In one example, the musical rule set unit can have core blocks dealing with key, tempo and time signal etc., pitch blocks dealing with melodies, motifs, harmonies, phrases and chords etc., beat blocks dealing with patterns, rhythms, grooves etc., and file blocks dealing with the output audio, for instance, MIDI files, Audio loops etc.

Each Musical Neuron 501 is independent neural networks which are trained on data specific to its use case. For instance, the rhythmic neuron is trained on an extensive catalog of rhythmic patterns sourced from MIDI data and as such it can spawn endless mutations from a small defined pool. These mutations will either spawn from real-time stimuli such as a user request or an event in the interactive system and can be single real time instances, or an on request mutated genetic pool containing hundreds of variations exposed to the Construction Automaton 11.

The constructor automaton 11 will use the rule definitions from the MRS unit 9 with any or all additions made through either real-time composer input, previous composer input, real time AI processing through musical neurons, offline AI processing from knowledge sourced by static and fluid data, or through various stages of loopback from performance parameters or any public variables originating from the interactive system. The Constructor Automaton 11 here serves to function as a layer for structuring a fluid piece of music by using several different building blocks. Different blocks can be adapted by guided composer input in detail to closely follow an intended composition or be driven by the AI for autonomous composition and procedural music generation. In one embodiment, the constructor automaton uses music handlers to generate music, the details will be described as follows.

Musical handlers are a collection of subsystems which provide various building blocks necessary for directed autonomous music creation. The Musical Handlers may be directly influenced by the user using either a modular flow chart GUI, through the music engine's API or by the AIAC 3 itself. In one example, the musical handlers comprise subsystem such as form blocks, composer blocks and expression blocks.

A form block is one subset of Musical Handlers containing information, knowledge and instructions on musical rule sets, musical transitions, chords structures, counterpoint etc. Inside the Form Blocks, the composer and/or AI will define preference on musical structure and a palette of allowed tools to reach the given goal, such as musical arcs, cadences, general form preference, chord structures, time signatures etc. For instance, a request for a key or a chord change, or even for a completely different section of music, will be processed by the Musical Handler and will only happen after a set of conditions have been met; such as moving through several key changes which are deemed necessary in order to make the transition as musical as possible.

A composer block is one subset of Musical Handlers containing information, knowledge and instructions on musical rule sets, musical and rhythmic phrases, instrumentation, expositions, MRS weights, orchestration etc. A composer block may be called upon by the Form Blocks. A composer block can contain imported midi regions, composed offline using other software, pre-defined melodies which serve as a basis for melodic and harmonic creation, preferences on orchestration either defined or specified from a database of common instrumentations, motif assignments as in which motifs should be prioritized in what instrumentation and range and connected to which stimuli (as in the theme of the hero or villain etc.).

Expression blocks act as a musical conductor, by relaying the musical data inside the Construction Automaton into the Performance Cluster. The expression blocks will deal with humanizing the musical data into sounding less mechanic, will adjust the dynamics of the music based on external stimuli from the interactive system, adjusting tempo according to the pacing of the scene.

The Performance Cluster unit 13 contains several parts, in one example, the parts are a MIDI block, an audio block and a filter block, that convert the musical signals into corresponding music control signals for real-time playback by the interactive system, by means of controlling at least one Audio Block. Based on the instructions from the Construction Automaton 11, an instrument/group of instruments will play notes within the MIDI Block, which allows for: direct MIDI output to other devices not incorporated inside the interactive system; a loopback to the AI for both iterative training purposes and as directions for the real time music generation; MIDI Polyphonic Expression (MPE) mappings for the different instruments. The note information and MPE mappings are passed to an Audio Block 17 which contains an instance of an instrument (sampler or synthesizer) which will playback the musical notes. The Audio block 17 as entity is regarded as a sound object which can be freely positioned spatially within the sound stage of the interactive system. The resulting audio from the Audio Block 17 can further be processed by members of a Filter Block which could contain Digital Signal Processor (DSP) filters bundled with the real-time music generation engine in the interactive system, third party VST effects or audio effects exposed by the parent host.

At any time of runtime, the internal instance of the real-time music generation engine in any interactive system may be overridden by a new master instance, in which case the music generation, analysis and performance will be controlled by the new master. A master is a separate entity of the real-time music generation engine inside a host such as, but not limited to, a tablet control app, a VST-instrument, a separate interactive system, a local and or public web server, an authorizing suit of the real-time music generation engine or any other software incorporating the real-time music generation engine.

This kind of live authoring mode allows for an easy way for composers, musicians, audio designers, content creators and the like to change their composition in real time even in deployed interactive mediums. This greatly improves the iterative process and allows to fine tune the music to fit the given instance in great details, all while bypassing the standard workflow of rendering audio files for offline playback.

By making each and every musical event, such as individual note triggers, chord changes, tempo changes, time signature changes, form changes, as well almost every other parameter in the system, exposed to the interactive system, the possibilities are huge for making musically reactive content. The current state of making musically reactive content is mostly based on spectral analysis using FFT to determine where the beats happen in the music and similar, or from preprogrammed triggers that sync with linear fixed content. In one embodiment of this invention, the music generation engine has any and every musical event, which can drive whatever you wish in the interactive system, such as but not limited to, particle systems, game logic, shader rendering, procedural systems etc.

At any time during runtime the interactive system may access the exposed API of the real-time music generation engine and send a stimuli request in order to trigger a musical response. The stimuli may be connected to any predefined receptor. The stimuli can also be a single byte of data, a numeric range, a data vector, a high level semantic instruction, etc. Aside from communication with the receptors, a direct control of parameters of the real-time music generation engine is available using the API.

In one embodiment, the interactive system may comprise receptors. The receptors are definable data inlets which group together one or several musical handlers, based on the decisions and definitions of the user/composer/artificial intelligence assistant composer. The receptors may be configured using a slew of different methods. Using the GUI of the real-time music generation engine in whichever connected instance, the user has the ability to drag and drop modular building blocks which each contain instructions for the specific musical handlers, which in turn feeds back into the Construction Automaton, as well as stimulating the generation of new music data which has inherited and mutated musical characteristics, which can be called Musical DNA hereafter, in the Musical Rule Set unit. A receptor maybe used for straightforward mapping to parameters inside the interactive system. For instance, a single trigger event received by a receptor could change the whole composition by triggering a chain reaction; a float value received by a receptor could gradually change the music in small increments; a float value received by a receptor could control a single instrument in minute detail; etc. Receptors can also be programmatically generated by the AIAC or shared as presets amongst an online community.

Further, the music engine may comprise a Future Fast Forward Preview unit (FFFP). The FFFP is configured for resulting music in future time, based on the status quo of Musical Rule Set unit 9, Musical DNA 309 and Construction Automaton 11. Essentially, this allows the composer to preview what the music sounds like at any point in the future while adjusting and composing in the now. Similar to chaos theory, any small change at any point in time will have great effect on everything past that point. Using the FFFP unit, a composer can compose music in a nonlinear fashion in collaboration with the generative systems, with the added benefit of being able to save any future results and use as a new genetic pool, or basis for Musical Handlers.

When used in offline mode it creates a whole new paradigm for film composers, where instead of calculating tempo and time signature manually just to make sure that key moments (called beats) in the film are properly synced and emphasized in the music, they can start by defining the key points and compose around them, while watching and hearing the music unfold around it. In order to achieve this, the real-time music generation engine will fast forward the generative process, by X amount of ticks as opposed to playing back in sound domain real time.

In one embodiment, the outputted audio from the interactive system can be looped back into the AIAC 3 for analysis of the spectral content using FFTs. Any and all audio streams from the interactive system can be used. Based on analysis the AIAC 3 can tweak the instrumentation in such a way that the sound effects from the interactive system are not in interference with the spectral content of the organically generated music.

The spectral information resulting from the FFT is classified in accordance to the spectral density, and used to determine if it contains human voice, or other pre-defined important audio elements (a car engine in a racing video game for instance) or generally classified on the spectral density. This is compared to the contents of an instrumentation knowledge base, containing the instrumental ranges and timbres of all known orchestral and acoustic instruments. In the case of using electronic and synthesized sounds, a frequency profile is generated based on the synthesizers use of waveforms and filters at several different octaves. Based on this knowledge, the system will restrict instruments from playing back notes which would sonically compete with the important sounds. The notes would either be muted, transposed into different octaves, moved to other instruments whose frequency response are more fitting or re-composed into something completely different. Furthermore, this could also trigger a chain reaction of a full re-instrumentation or restructure of the future form.

A typical use case scenario would be to determine if human voice is being spoken (based on the frequency content characteristic typical for human voice) and avoid playback of instruments with a timbre and range which conflicts with the voice, thus increasing the legibility of spoken words. As a comparison, current tech relies on DSP effects such as compression or equalization of the music in order to let spoken voice through, which negatively impacts the sonic quality and perception of the music. The same procedure could be used for all other types of sound effects as well, (take a roaring engine for instance, and leaving space for that sound in the musical mix) to ensure that the resulting final audio mix is clean and neat.

Since the system is designed for a continuous two-way communication, the same audio analysis method is viable for limiting the playback of certain sound effects based on what is currently happening in the music.

In one embodiment, the real-time music generation engine analyzes using pitch tracking to determine chord structures over time, melodic themes and harmonies; using polyphonic separation through several analysis methods. One such method would be a compose of fast Fourier transforms to determine the fundamental frequency (f0) of the most prominent instrument and associating the harmonics likely to stem from such a fundamental to said instrument. The associated harmonics would be decided from a combination of the natural harmonic series as well as from a weighing of timbre influenced by an assumption of instruments commonly playing in the frequency range of the fundamental. Further separation of instruments would follow a similar pattern, where additional fundamentals are found from spectral amplitude analysis, where the additional fundamentals have a frequency content which deviates from what would be likely harmonics of the previous, stronger one. The analysis also takes into account stereo/multi-channel separation when determining the pitches and instrumentation.

Figure 2:
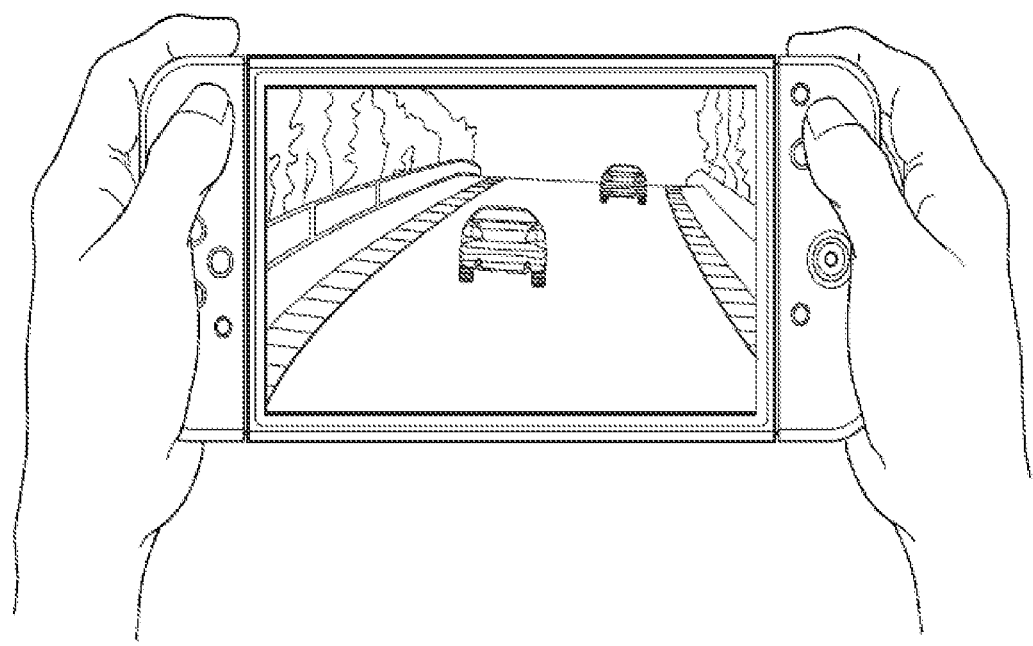
FIG. 2 is an example of a gaming environment in the interactive system in accordance with the present disclosure.

FIG. 2 shows an example of a gaming environment in the interactive system in accordance with the present disclosure. In this example, the interactive environment is a racing game, in which the music engine can generate real-time music based on for example, but not limited to, the rate of the racing car, the sound of the motor etc.

Figure 3:
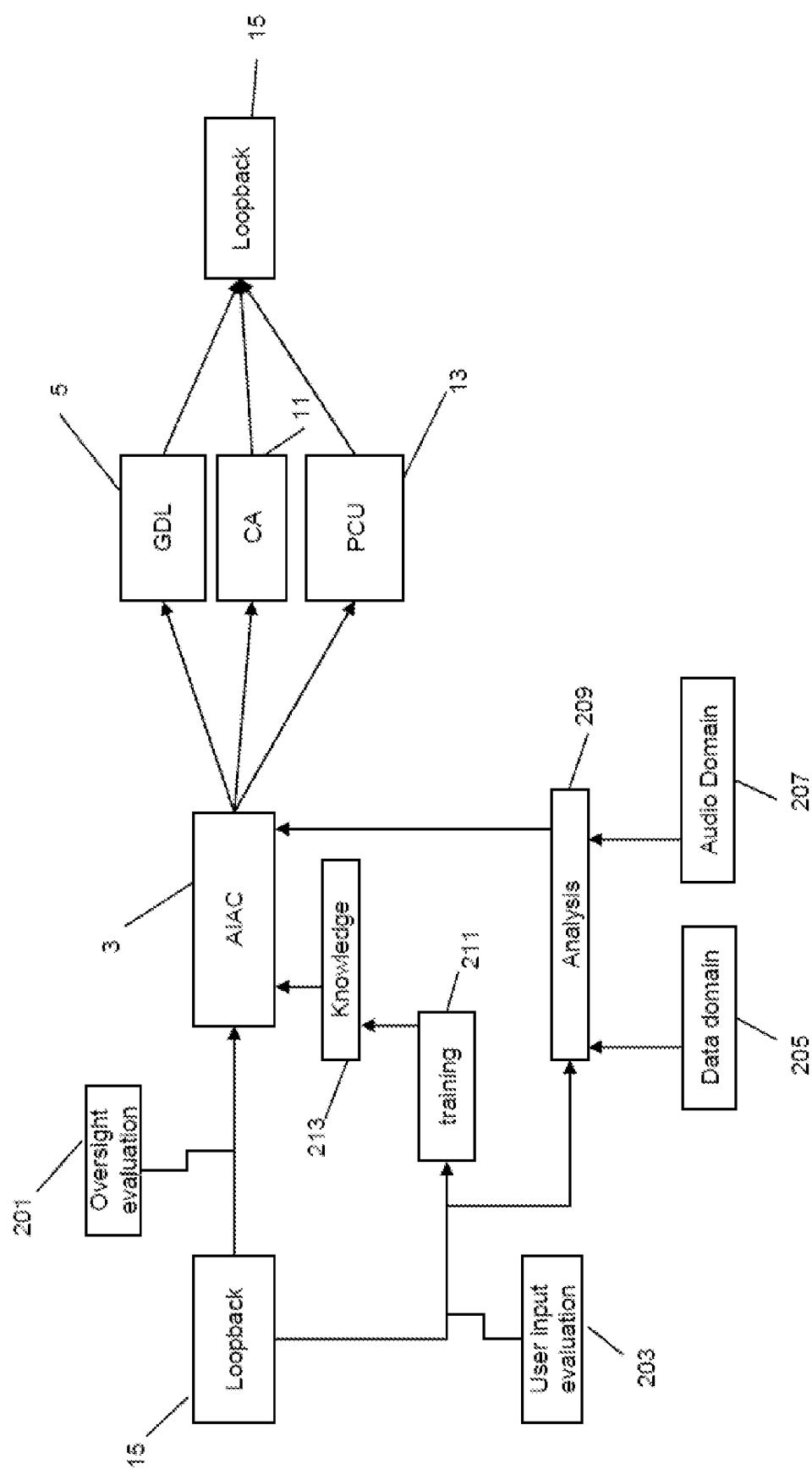
FIG. 3 is an example of the loopback mechanism in an Artificial Intelligence Assistant Composer (AIAC) in accordance with the present disclosure.

FIG. 3 shows an example of the loopback mechanism in the AIAC 3. During the generation of music, any stages of loopback from the CA 11 or PCU 13 can be inputted to AIAC 3 for both iterative training purposes and as directions for the real time music generation. The training process of the AIAC 3 can be based on user input evaluation and loopback, then knowledge is stored in the AIAC 3 as the training result. The loopback can also be used for analysis in both data domain and audio domain. Then AIAC 3 based on the new knowledge or oversight evaluation can direct the GDL 5, the CA 11 or the PCU 13 to generate new music piece. The output of the GDL 5, the CA 5 or the PCU 13 can also be loopback to AIAC 3 again. In this way, the generated music can be adjusted in an interactive way according to the user's need or environment.

Figure 4:
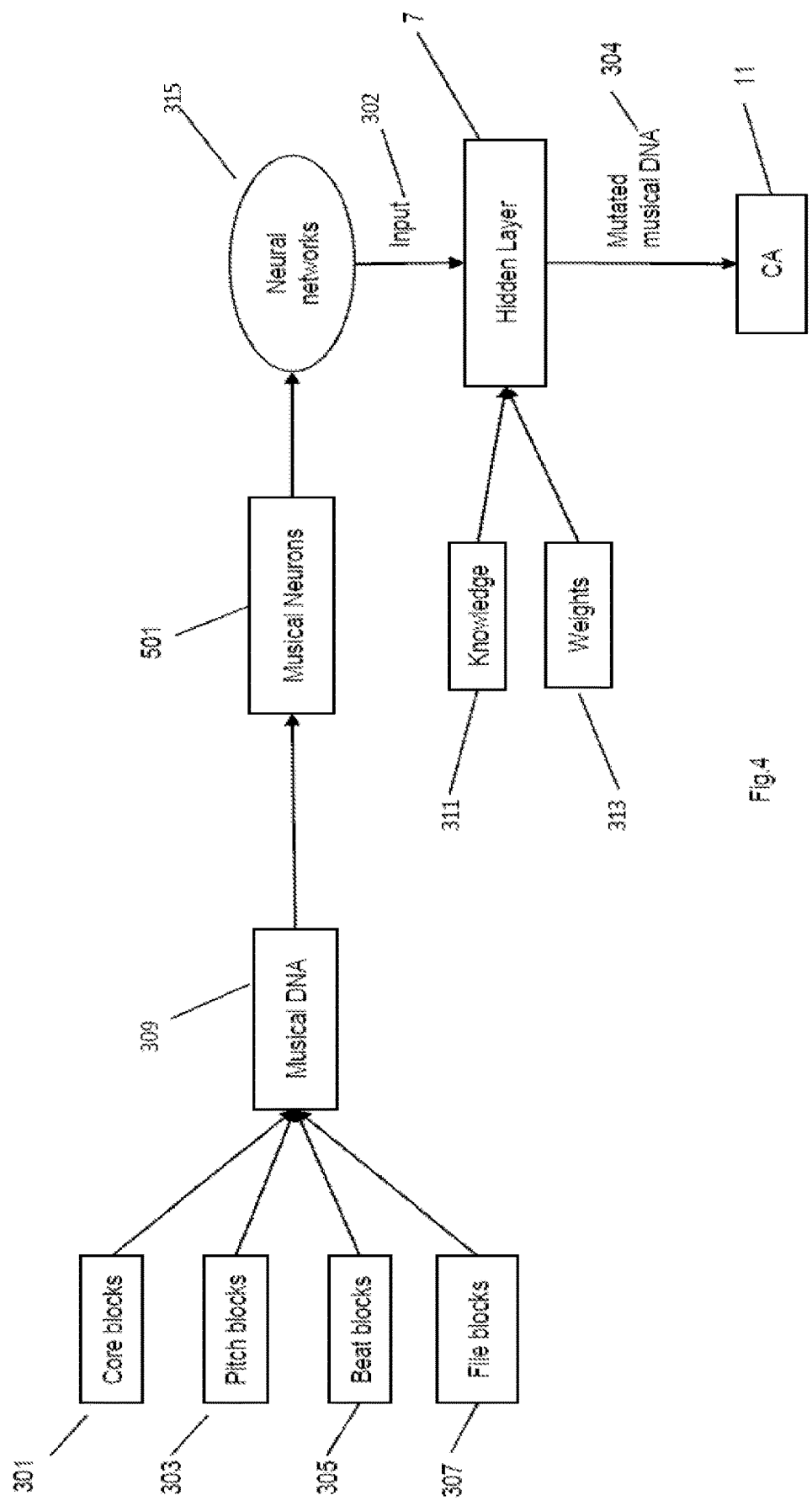
FIG. 4 is a schematic of a Genetic Design Layer in accordance with the present disclosure.

FIG. 4 is a schematic example of a Genetic Design Layer 5 in accordance with the present disclosure. The Musical DNA 309 uses input from the MRS unit 9, which can have core blocks 301, pitch blocks 303, beat blocks 305 and file blocks 307. The output of the Musical DNA 309 is dealt by musical neurons 5 and neural networks 315. The output of the neural networks 315 is input of a Hidden Layer 7, which mutates musical DNA 309 based on the input, knowledge of AIAC 3 and MRS weights. The mutated musical DNA 309 will be outputted to the CA 11 to generate new fluid piece of music by combing the rule definitions and the new mutated musical characteristics from the GDL 5.

Figure 5:
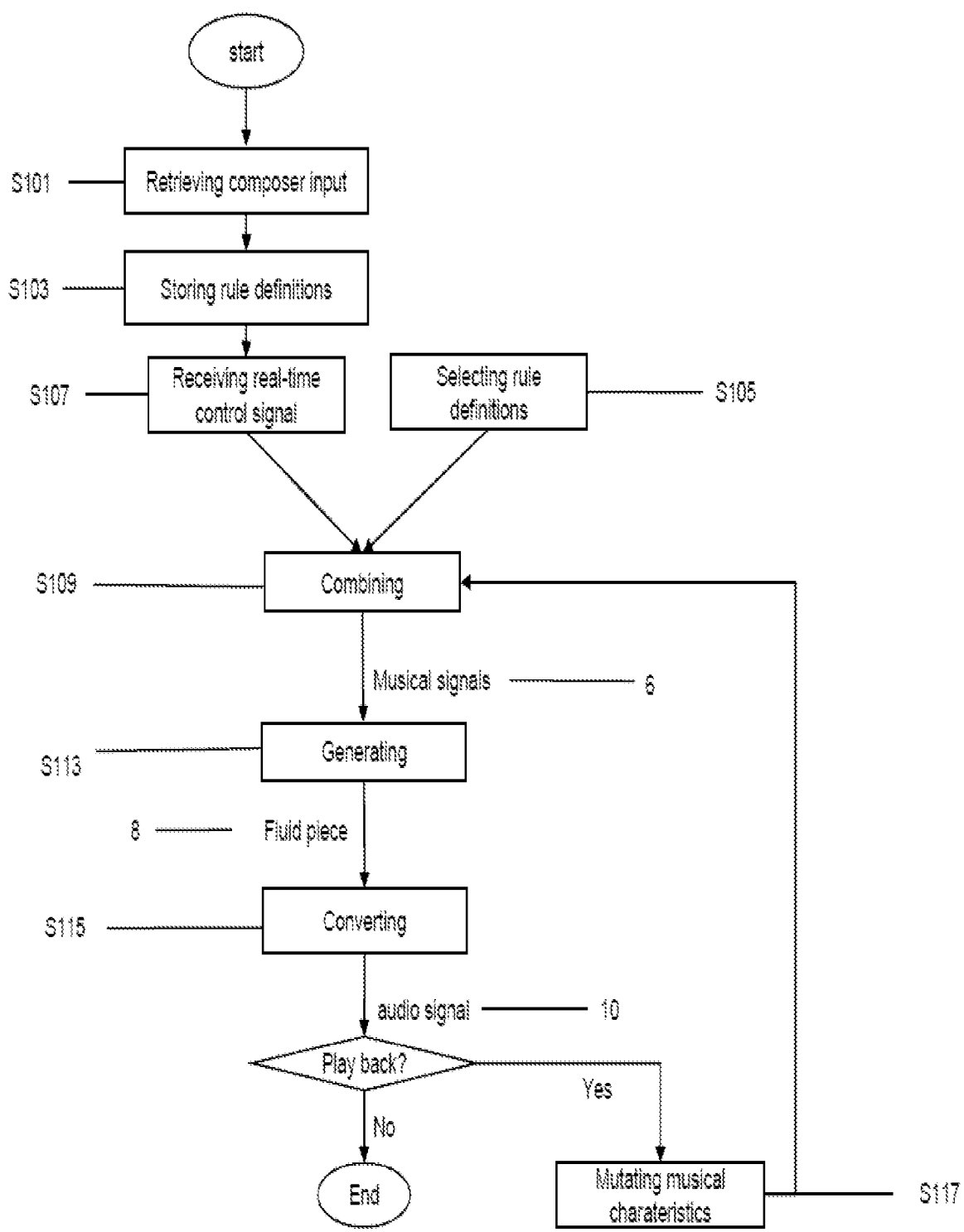
FIG. 5 is an example of a method for real-time music generation.

FIG. 5 is an example of a method for real-time music generation. At the start of the method, the MRS unit 9 retrieves a composer input at S101, a set of adaptable rule definitions 701 will be obtained based on the composer input and stored in a memory of the MRS unit 9 at S103. Then the MRS selects a set of rule definitions from the memory at S105. At S107, the MRS unit 9 receives a real-time control signal, and combines the control signal and the selected rule definitions at S109. The output musical signals 6 are outputted to the CA 11. The CA 11 will generate a fluid piece of music at S113 and the output music of the CA 11 will be an input of the PCU 13. At S115 the PCU 13 converts the fluid piece of music into a corresponding music control signal for real-time playback by the interactive system, by means of controlling at least one Audio Block operatively connected to said interactive system. If the output audio signal 10 is required to playback, the audio signal 10 will be loopback to the AIAC or the CA and the musical characteristics will be mutated at S117, and the process goes back to S109 to generate music piece of music.

By RID 23 is meant a data inlet to be used for indirectly as well as directly controlling the music currently being generated by the system. As commonly known by those skilled in the art, the term real-time is a relative term referencing something responding very quickly within a system. In a digital system there is no such thing as instant, since there is always a latency through gates, flip-flops, sub-system clocking, firmware and software. For the avoidance of doubt, the term real-time within the scope of this disclosure is describing events that appear instantly or very quickly when compared to musical time-scales such as bars or sub bars. Such RIDs could be, but are not limited to, virtual parameters such as parameters in a video game, one or more touch-screens, gesture sensors such as cameras or laser based sensors, gyroscopes, and other motion tracking systems, eye-tracking devices, vocal input systems such as pitch detectors, auto-tuners and the like, dedicated hardware mimicking musical instruments or forming new kinds of musical instruments, network commands, artificial intelligence input and the like. The RID-block may be configured to run asynchronous with other blocks in the system and the control signal generated by the RID block may thereby be asynchronous with the musical time-scale.

In one embodiment the RID 23 is a sub-system receiving input from one or more virtual data inlets, such as but not limited to, parameters in an interactive application, an artificial intelligence (AI) algorithm or entity, a network of remote musicians, a loop handler, a multi-dimensional loop handler, one or more random generators and any combinations thereof.

In another embodiment the RID 23 could be connected to a musically trained AIAC. Such AI acting as a musician may be based on a certain deep learning and/or artificial neural network implementation such as, but not limited to, Deep Feed Forward, Recurrent Neural Network, Deep Convolutional Network, Liquid State Machine and the likes. Said AI may also be based on other structures such as, but not limited to, Finite State Machines, Markov Chains, Boltzmann Machines and the likes. The fundamental knowledge that these autonomous processes are based upon may be a mixture of conventional musical rules, such as the studies of counterpoint, Schenkerian analysis and similar musical processes, as well as community driven voting per generation or other means of human quality assurance. The knowledge may also be sourced through deep analysis of existing music in massive scale using online music libraries and streaming services through means such as but not limited to, FFT/STFT analysis of content using neural networks and Haar cascades, pitch detection in both spectral/temporal and frequency domains, piggybacking on existing API's per service or using Content ID systems otherwise designed for copyright identification, etc. Furthermore, said AI can be trained using existing music libraries by means of audio analysis, polyphonic audio analysis, metadata tags containing information about certain musical rules such as, but not limited to, scales, key, meter, character, instruments, genre, style, range, tessitura, and the likes.

In yet another embodiment the RID 23 could be end user input devices such as, but not limited to, mouse and keyboard, joysticks, racing wheels, analog and digital controllers, a Microsoft Kinect gaming controller, a virtual reality or augmented reality interface, a gyroscopic motion sensor, a camera based motion sensor, a facial recognition device, a 3D-camera, range camera, stereo camera, laser scanner, beacon based spatial tracking such as the Lighthouse technology from Valve or other means of providing a spatial reading of the end user and optionally also the environment surrounding the end user.

In yet another embodiment the control signal is replaced or complemented by control input from a remote network of one or more musicians. The data rate of such remote-control signal is kept to a minimum in order to avoid excessive latency that would make the remote musician input very difficult. The present disclosure solves this data rate issue inherently since the music is generated in real-time by each separate instance of the system running the same MRS unit 9 and/or CA 11 and/or PCU 13 settings in each remote musician location and therefore no audio data needs to be transmitted across the network, which would require data rates many times higher than that of the remote-control signals. Furthermore, said input from remote musicians as well as note trigger signals need to be synchronized in order for the complete piece of generated music to be coherent. In this embodiment, clocks of the remote systems are all synchronized. This synchronization can be achieved by Network Time Protocol (NTP), Simplified Network Time Protocol (SNTP), Precision Time Protocol (PTP) or the like. Synchronization of clocks across a network is considered known to those skilled in the art. By musician is meant anyone or anything affecting the music being generated by the disclosed system in real-time by manipulating the input to the RID 23.

In yet another embodiment, the network of remote musicians and instances of the present disclosed system as described above, is built on 5G or other future communication standards or network technologies focused on low latency rather than high bandwidth.

In another one embodiment the control signal corresponds to a cursor status received from a RID 23 in the form of a musician using a touch screen. Said cursor status could contain information about position on screen as X and Y coordinates and a Z coordinate could be corresponding to the amount of pressure on the screen. These control signal values (X, Y, Z) can be transmitted to the MRS unit 9 and/or the CA 11 and/or the PCU 13 and re-transmitted whenever updated. When the control signal 2 is updated, the MRS unit 9 and/or the CA 11 and/or the PCU 13 can synchronize the timing of said control signal according to the system timing and the pre-defined musical rules. One way of mapping said control signal 2 to musical rules within the MRS unit 9 and/or the CA 11 and/or the PCU 13 is to let X control rhythmical intensity, such as but not limited to, pulse density and let Y control the tonal pitch, such as but not limited to, pitches or chords and let Z control the velocity of that pitch, chord or the like. Said velocity could, but is not limited to, control the attack, loudness, envelope, sustain, audio sample selection, effect or the like of the corresponding virtual instrument being played by the audio generator block 17.

In yet another embodiment the RID 23 may consist of a motion sensor, such as but not limited to a Microsoft Kinect gaming controller, a virtual reality or augmented reality interface, a gyroscopic motion sensor, a camera based motion sensor, a facial recognition device, a 3D-camera, range camera, stereo camera, laser scanner, beacon based spatial tracking such as the Lighthouse technology from Valve or other means of providing a spatial reading of the musician and optionally also the environment surrounding the musician. One or more resulting 3-dimensional position indicators may be used as a control signal and may be interpreted as X, Y and Z coordinates according to the above description when mapped to musical parameters by the MRS unit 9 and/or the CA 11 and/or the PCU 13.

Such spatial tracking may also be established by less complex 2-dimensional input devices, such as but not limited to digital cameras, by means of computer vision through methods such as centroid tracking of pixel clusters, Haar cascade image analysis, neural networks trained on visual input, or similar approaches and thereby generate one or more cursor positions to be used as control signal.

In yet another embodiment the RID 23 could be a piece of dedicated hardware, such as but not limited to, new types of musical instruments, replicas of traditional musical instruments, DJ-equipment, live music mixing equipment or similar devices generating the corresponding X, Y, Z, cursor data used as the control signal.

The real time music generation engine may be used in a conventional linear composition setting as well and it is not imperative that it is used in conjunction with an interactive system.

It will be appreciated that additional advantages and modifications will readily occur to those skilled in the art. Therefore, the disclosures presented herein, and broader aspects thereof are not limited to the specific details and representative embodiments shown and described herein. Accordingly, many modifications, equivalents, and improvements may be included without departing from the spirit or scope of the general inventive concept as defined by the appended claims and their equivalents.

The invention claimed is:

1. A real-time music generation engine for an interactive system, wherein the music generation engine and the interactive system are communicatively connected to transmit parameters relating to music generation between them, comprising:
 a musically asynchronous real-time input device, RID, configured to generate a musically asynchronous real-time control signal configured to drive said music generation engine constrained by a predefined composer input, wherein the real-time control signal is an immediate data inlet for directly controlling and/or dynamically modifying the music currently being generated by the engine;
 a Musical Rule Set, MRS, unit comprising the predefined composer input, wherein the MRS unit is configured to combine said predefined composer input with the musically asynchronous real-time control signal generated by the RID into a music signal, wherein the MRS unit is configured to output the music signal to the CA;
 a Constructor Automaton, CA, configured to generate a fluid piece of music note-by-note in real-time based on the music signal received from the MRS unit and on rule definitions defined by the predefined composer input within the MRS unit by means of musical handlers; and
 a Performance Cluster Unit, PCU, configured to convert the fluid piece of music from the CA into a corresponding musical control signal;
 wherein the musical control signal is in MIDI form, or
 wherein the musical control signal is used for real-time playback by the interactive system, by means of controlling at least one Audio Block operatively connected to said interactive system.

2. The real-time music generation engine in accordance with claim 1, wherein the Musical Rule Set, MRS, unit is adaptable in real-time.

3. The real-time music generation engine in accordance with claim 1, wherein the music control signal from the PCU is adapted for loopback to a musically trained AI system for iterative training and directing the real time music generation.

4. The real-time music generation engine in accordance with claim 1, wherein the music engine further comprises a Genetic Design Layer, GDL, configured to mutate musical characteristics from the rule definitions based on the real-time control signal or predefined musical knowledge within a musically trained AI system.

5. The real-time music generation engine in accordance with claim 4, wherein the CA is further configured to generate new fluid music by combining the rule definitions and the new mutated musical characteristics from the GDL.

6. The real-time music generation engine in accordance with claim 1, wherein the music engine further comprises an Audio Analysis Block, AAB, configured to analyze spectral information of any outputted audio being played back by the interactive system,
 wherein the PCU is further configured to respond to said spectral information such that the generated music does not interfere with other important audio elements in the interactive system by means of restricting use of certain notes and/or instruments that would otherwise risk obscuring said important audio elements.

7. The real-time music generation engine in accordance with claim 6, wherein the spectral information is classified in accordance to spectral density.

8. The real-time music generation engine in accordance with claim 1, wherein the engine is configured to allow the generated music to be reviewed and adjusted at any time during run-time.

9. The real-time music generation engine according to claim 1, wherein the RID comprises one or more end user input devices, and is connected to a musically trained AIAC.

10. The real-time music generation engine according to claim 1, wherein the RID is a subsystem arranged to receive input from one or more virtual data inlets.

11. The real-time music generation engine according to claim 1, wherein the RID is one or more of virtual parameters including parameters in a video game, one or more touch-screens, gesture sensors including cameras or laser-based sensors, gyroscopes, other motion tracking systems and eye-tracking devices.

12. A method for generating real-time music in a music generation engine for an interactive system communicatively connected to said music generation engine to transmit parameters relating to music generation between them, wherein said music generation engine comprises a Musical Rule Set, MRS, unit, a Constructor Automaton, CA, and a Performance Cluster Unit, PCU, said method comprising:
 retrieving a predefined composer input in the MRS unit;
 storing a plurality of adaptable rule definitions according to the retrieved predefined composer input in a memory of the MRS unit;
 generating a musically asynchronous real-time control signal by a musically asynchronous real-time input device, RID, the real-time control signal being configured to drive said music generation engine constrained by the predefined composer input, wherein the musically asynchronous real-time control signal is an immediate data inlet for directly controlling and/or dynamically modifying the music currently being generated by the engine;
 receiving the musically asynchronous real-time control signal in the MRS unit, wherein the MRS unit is configured to combine said predefined composer input with the musically asynchronous real-time control signal generated by the RID into a music signal, wherein the MRS unit is configured to output the music signal to the CA;
 driving said music generation engine constrained by the predefined composer input;
 generating a fluid piece of music note-by-note in real-time based on the music signal received from the MRS unit and on the rule definitions defined by the predefined composer input in the CA by means of musical handlers; and converting the fluid piece of music from the CA into a corresponding music control signal in the PCU for real-time playback by the interactive system, by controlling at least one Audio Block operatively connected to said interactive system.

13. The method in accordance with claim 12, wherein the Musical Rule Set, MRS, unit is adaptable in real-time.

14. The method in accordance with claim 12, wherein the music control signal from the PCU is adapted for loopback to a musically trained AI system for iterative training and directing the real time music generation.

15. The method in accordance with claim 12, wherein the method further comprises:

mutating musical characteristics from the rule definitions based on the real-time control signal or predefined musical knowledge within a musically trained AI system in a Genetic Design Layer, GDL within the music generation engine.

16. The method in accordance with claim 15, wherein the method further comprises:

generating new fluid music by combining the rule definitions and the new mutated musical characteristics from the GDL.

17. The method in accordance with claim 12, wherein the method further comprises:

analyzing spectral information of any outputted audio being played back by the interactive system in an Audio Analysis Block, AAB, within the music generation engine; and responding to said spectral information in the PCU, such that the generated music does not interfere with other important audio elements in the interactive system by restricting use of certain notes and/or instruments that would otherwise risk obscuring said important audio elements.

18. The method in accordance with claim 17, wherein the spectral information is classified in accordance to spectral density.

19. The method in accordance with claim 12, wherein the method further comprising reviewing and adjusting the generated music at any time during run time.

20. A computer program product embodied on a non-transitory computer readable medium and comprising computer-readable instructions which, when executed on a computer, causes a method according to claim 12 to be performed.

* * * * *